United States Patent [19]
Levif et al.

[11] Patent Number: 5,145,897
[45] Date of Patent: Sep. 8, 1992

[54] RUBBERY COMPOSITION AND POLYNORBORNENE-BASED THERMOPLASTIC ELASTOMER WITH IMPROVED HEAT STABILITY

[75] Inventors: Gabriel Levif, Nogent sur Oise; Frederic Coupe, Verneiul en Halatte, both of France

[73] Assignee: Atochem, Paris, France

[21] Appl. No.: 635,545

[22] PCT Filed: Jul. 3, 1990

[86] PCT No.: PCT/FR90/00503
§ 371 Date: May 1, 1991
§ 102(e) Date: May 1, 1991

[87] PCT Pub. No.: WO91/00311
PCT Pub. Date: Jan. 10, 1991

[30] Foreign Application Priority Data

Jul. 4, 1989 [FR] France .................. 89 08985
May 18, 1990 [FR] France .................. 90 06265

[51] Int. Cl.$^5$ .................. C08L 23/28; C08L 45/00
[52] U.S. Cl. .................. 524/296; 524/474; 524/484; 524/485; 524/518; 525/194; 525/210; 525/359.6
[58] Field of Search .......... 525/194, 210, 359.6; 524/296

[56] References Cited

U.S. PATENT DOCUMENTS

| | | | |
|---|---|---|---|
| 2,567,135 | 9/1951 | Sturgis et al. | 525/359.6 |
| 3,676,390 | 7/1972 | Vergne et al. | 260/31.8 HR |
| 4,203,884 | 5/1980 | Coran et al. | 260/33.6 AQ |
| 4,874,808 | 10/1989 | Minami et al. | 525/210 |
| 4,918,133 | 4/1990 | Moriya et al. | 525/210 |
| 4,990,559 | 2/1991 | Shiraki et al. | 525/210 |

FOREIGN PATENT DOCUMENTS

| | | |
|---|---|---|
| 0018751 | 11/1980 | European Pat. Off. . |
| 0070220 | 3/1986 | European Pat. Off. . |
| 413151 | 6/1974 | U.S.S.R. . |
| 2162526 | 2/1986 | United Kingdom . |

OTHER PUBLICATIONS

*Chemical Abstracts*, 1981, vol. 94, page 64.

Primary Examiner—Carman J. Seccuro, Jr.
Attorney, Agent, or Firm—Cushman, Darby & Cushman

[57] ABSTRACT

The invention relates to a polynorbornene-based rubbery composition with improved thermal behaviour, comprising a mixture of at least 50% by weight of polynorbornene and not more than 50% by weight of another rubber, the said mixture having been vulcanized by means of effective quantity of at least one compound:

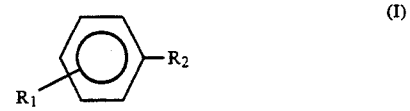

(I)

where $R_1$, $R_2$ = $CH_nX_{3-n}$, with X=F, Cl or Br and n = integer from 0 to 2; the invention also relates to a thermoplastic composition comprising 10–90 parts by weight (pw) of at least one olefin-based crystalline polymer (A), from 90–10 pw of a mixture (B) of at least 50% by weight of polynorbornene and not more than 50% by weight of another rubber, and a sufficient quantity of plasticiser for polynorbornene to lower its glass transition temperature to the range of rubbers, the sum of (A) and of (B) being equal to 100 pw and (B) being vulcanized by means of an effective quantity of at least one compound (I). Use: manufacture of finished products and industrial articles by extrusion, extrusion blowing, injection moulding and compression moulding.

10 Claims, No Drawings

RUBBERY COMPOSITION AND POLYNORBORNENE-BASED THERMOPLASTIC ELASTOMER WITH IMPROVED HEAT STABILITY

The present invention relates to polynorbornenebased rubbery compositions with an improved heat stability and to thermally stable thermoplastic elastomers obtained from these compositions.

Formulated and vulcanised polynorbornene is a rubber which is quite sensitive to thermal degradation because of its high degree of unsaturation. When the vulcanising system employed is sulphur-based, it results in bridges containing sulphur-sulphur bonds which make the vulcanised polynorbornene proportionately more vulnerable to temperature. Thus, it is known that rubbers formulated from polynorbornene generally lose the essential part of their mechanical properties (especially tensile strength and elongation at break) after long-term aging periods at temperatures above 80° C.

A number of solutions have already been proposed to improve the thermal aging behaviour of polynorbornene-based formulated rubbers. Among these solutions there may be mentioned especially the addition to the formulated rubber of at least one antioxidant of phenolic type or else such as the zinc salt of mercaptobenzoimidazole. It is also possible to mention the use of reactive compounds capable of forming carbon-oxygen or carbon-carbon bonds, such as phenolic resins, generally coupled with accelerating compounds such as Lewis acids or some metal oxides (in particular those of zinc and of magnesium). As an example of such a reactive system there may be mentioned the combination of stannous chloride with a phenolic resin of formula:

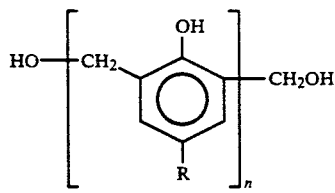

in which: n=4 or 5 and R denotes an alkyl radical. The abovementioned solutions for improving the thermal aging behaviour of polynorbornene-based formulated rubbers can naturally be combined to strengthen their effects However, even in this case it is generally observed that the said rubbers lose more than 80% of their tensile strength after an aging period of 7 days at 100° C. and lose virtually all of their mechanical properties (elongation and tensile strength) after 14 days' aging at 100° C. This situation quite obviously impedes the use of polynorbornene-based formulated rubbers in a number of applications.

A first objective of the present invention consists therefore in developing an effective means for improving the thermal aging behaviour of polynorbornene-based formulated rubbers, and in particular for maintaining the essential part of their mechanical properties after long-term aging at temperatures above 80° C.

Furthermore, patent U.S. Pat. No. A-4,203,884 teaches that compositions comprising a mixture of a thermoplastic crystalline polyolefin, polynorbornene and a sufficient quantity of plasticiser for polynorbornene to lower its glass transition temperature to the range of rubbers have advantageous properties. More particularly, this document discloses compositions comprising a mixture of 75 to 10 parts by weight of polyolefin, 25 to 90 parts by weight of polynorbornene, and 30 to 400 parts by weight of plasticiser per 100 parts by weight of polynorbornene, the said compositions being elastoplastic, that is to say that they have elastomeric properties while being capable of being converted like thermoplastics. In the molten state, according to this technique, some of the plasticiser may be present in the thermoplastic polyolefin phase. After cooling, the plasticiser migrates substantially from the crystalline polyolefin phase towards the polynorbornene phase, to form part of the latter. In this way, the plasticiser improves the thermoplasticity or the processability of the composition. As a general rule, for a given degree of thermoplasticity, the composition requires proportionally less polyolefin, the greater the quantity of plasticiser.

U.S. Pat. No. A-4,203,884 also discloses compositions comprising a mixture of 10 to 90 parts by weight of crystalline polyolefin and 90 to 10 parts by weight of crosslinked polynorbornene dispersed in the form of small-sized particles, and plasticiser in a sufficient quantity to lower the glass transition temperature of the polynorbornene to the range of rubbers. Thus, the cross-linking of the polynorbornene improves the compromise of the properties of the composition, in particular the tensile strength, the solvent resistance and the high-temperature properties. Such compositions are obtained by a dynamic vulcanisation process according to which a mixture of polynorbornene, plasticiser, polyolefin and crosslinking agents is kneaded at a sufficient temperature to crosslink the polynorbornene.

Among the thermoplastic crystalline polyolefins which can be employed according to U.S. Pat. No. A-4,203,884 there may be mentioned polyethylene and polypropylene, the latter being preferred. However, whether the polynorbornene be crosslinked or not, the compositions according to U.S. Pat. No. A 4,203,884 have in common the disadvantage of an inadequate thermal aging behaviour which is reflected in the loss of a substantial part of the mechanical properties (especially tensile strength and elongation at break) after a long-term aging at temperatures above 80° C. As in the above case of the polynorbornene-based formulated rubbers, the addition of an antioxidant of phenolic type and/or of a zinc salt of mercaptobenzoimidazole and/or of a reactive compound such as a phenolic resin coupled, if appropriate, with an accelerator such as a Lewis acid or a metal oxide has been found to be insufficiently effective. This is why a second objective of the present invention consists in developing a really effective means for improving the heat aging behaviour of elastoplastic compositions based on crosslinked polynorbornene and on crystalline polyolefin, such as especially those in accordance with U.S. Pat. No. A-4,203,884, and in particular for maintaining the essential part of their mechanical properties (especially tensile strength and elongation at break) after long-term aging at temperatures above 80° C.

In accordance with the abovementioned first objective, the first subject of the present invention is a polynorbornene-based rubbery composition with improved heat stability, characterised in that it comprises a mixture of at least 50% by weight of polynorbornene and not more than 50% by weight of another rubber and in that the said mixture has been vulcanised by means of an effective quantity of at least one compound of formula:

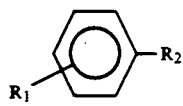

in which $R_1$ and $R_2$, which are identical or different, are chosen from radicals $CH_nX_{3-n}$, X being a halogen atom chosen from fluorine, chlorine and bromine, and n being an integer ranging from 0 to 2.

In the compounds of formula (I) which can be employed according to the invention the radical $R_1$ may be situated in an ortho, meta or para position. A preferred example of such a compound consists of hexachloroparaxylene.

The effective quantity of the compound of formula (I) to be employed in the compositions according to the invention has to be related to the quantity of mixture of polynorbornene and rubber present in the said composition. An effective quantity within the meaning of the present invention generally means a quantity of approximately between 0.1% and 6% by weight relative to the mixture of polynorbornene and rubber.

A polynorbornene within the meaning of the present invention means an amorphous polymer or copolymer of bicyclo[2.2.1]-2-heptene and of its substituted derivatives such as are described in U.S. Pat. No. 676,390.

A rubber intended to be mixed with polynorbornene in accordance with the present invention means a rubber chosen especially from natural rubber, nitrile rubber, butadiene rubber, styrene-butadiene rubber, polychloroprene, butyl and brominated butyl rubbers, polyisoprene and ethylene-propylene and ethylene-propylene-diene rubbers, the diene being chosen from conjugated or unconjugated, linear or cyclic dienes such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)-2-norbornene, 1,5-cyclooctadiene, bicyclo[2.2.2]-2,5-octadiene, cyclopentadiene, 4,7,8,9-tetrahydroindene and isopropylidenetetrahydroindene. These last rubbers generally contain approximately between 15 and 60 mol % of propylene-derived units and approximately between 0.1 and 20 mol % of diene-derived units.

Besides the mixture of polynorbornene and of rubber vulcanised using the compound of formula (I) which constitutes its characteristic component, the rubbery composition according to the invention may comprise at least one vulcanisation activator or accelerator such as, for example, zinc oxide or magnesium oxide.

In the rubbery compositions according to the invention the mixture of polynorbornene and rubber is preferably crosslinked up to the point where not more than 10%, preferably not more than 5%, of the polynorbornene can be extracted with a solvent such as boiling xylene, in which uncrosslinked polynorbornene is completely soluble.

The rubbery composition according to the invention generally additionally comprises at least one plasticiser for polynorbornene, capable of lowering its glass transition temperature to the range of rubbers. There may be mentioned under this heading aromatic, naphthenic or paraffinic heavy oils derived from petroleum, with a setting point below 0° C. and a flash point above 180° C., and diesters of phthalic acid, such as dioctyl or didodecyl phthalates. These plasticisers may be employed pure or mixed.

The rubbery composition according to the invention may additionally include usual ingredients such as:

antioxidants such as substituted phenols or the zinc salt of mercaptobenzoimidazole, pulverulent fillers such as kaolin, silica, carbon black, alumina, clay, aluminosilicate, talc or carbonate.

In accordance with the objective which is sought, the rubbery composition according to the invention exhibits a satisfactory thermal aging behaviour and in particular retains the essential part of its mechanical properties after long-term aging at temperatures above 80° C.

In accordance with the abovementioned second objective, the second subject of the present invention is a composition comprising:

from 10 to 90 parts by weight of at least one olefin-based crystalline polymer (A), from 90 to 10 parts by weight of a mixture (B) of at least 50% by weight of polynorbornene and not more than 50% by weight of another rubber, and a sufficient quantity of plasticiser for polynorbornene to lower its glass transition temperature to the range of rubbers, the sum of the polymer (A) and of the mixture (B) being equal to 100 parts by weight and the mixture (B) being vulcanised by means of an effective quantity of at least one compound of formula:

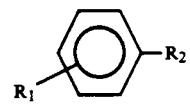

in which $R_1$ and $R_2$, which are identical or different, are chosen from radicals $CH_nX_{3-n}$, X being a halogen atom chosen from fluorine, chlorine and bromine, and n being an integer ranging from 0 to 2.

The olefin-based crystalline polymer which may be employed in the thermoplastic composition according to the invention may belong to any one of the following classes:

propylene polymers, in particular isotactic polypropylene and copolymers containing at least 80 mol % of units derived from propylene and not more than 20 mol % of units derived from ethylene or from an alpha-olefin containing from 4 to 10 carbon atoms;

radical ethylene polymers, generally obtained by high pressure polymerisation and having a relative density approximately from 0.91 to 0.93;

linear ethylene polymers, generally obtained by polymerisation in the presence of Ziegler catalysts and especially including high density polyethylene and copolymers of ethylene and of at least one alpha-olefin containing from 3 to 10 carbon atoms. Among the latter, those which have a relative density of between 0.89 and 0.93, a crystallinity of between 15 and 50% and a melt index of between 0.5 and 15 dg/min are particularly advantageous. Such copolymers are well known to a person skilled in the art and can be prepared by various processes, either at low pressure and moderate temperature or at high pressure and elevated temperature. Corresponding to the density range which is indicated, their molar content of alpha-olefin is generally between 1 and 10%, depending on the nature of the alpha-olefin. Among the alpha-olefins which can form part of the constitution of these copolymers, those very particularly mentioned will be propylene, 1-butene, 1-hexene, 4-methyl-1-pentene and 1-octene. Among the ethylene/alpha-olefin copolymers which may be employed according to the present invention, those advantageously preferred are ethylene/propylene/ 1-butene terpolymers and copolymers of ethylene and of higher alpha-olefins (that is to say containing at least 4 carbon atoms), in accordance with European Patent No. 070,220. The latter are copolymers with particularly pronounced macromolecular heterogeneity, that is to say those in which the alpha-olefin content can depart significantly, according to the crystalline or amorphous fractions in which it is measured, from the average content of alpha-olefin in the copolymer. In some copolymers of this type the heterogeneity may be such that the alpha-olefin content in a crystalline fraction may be 1/10th (one tenth) of the average content and that the alphaolefin content in an amorphous fraction may be up to 5 times the average content. Furthermore, such heterogeneous copolymers are advantageously such that their crystalline fractions exhibit a single melting peak at a temperature between 116° and 130° C. Among their other preferred characteristics there may be mentioned:

an overall degree of unsaturation of between 0.25 and 0.50 double bonds per 1,000 carbon atoms, a polydispersity index of between 3 and 9 when the copolymer includes a single alpha-olefin, between 6 and 12 when the copolymer includes at least two alpha-olefins, a number-average molecular weight $M_n$ of approximately between 12,000 and 60,000, copolymers of ethylene and at least one alkyl acrylate in which the alkyl group contains from 1 to 8 carbon atoms, preferably comprising from 0.5 to 7 mol % of acrylate and preferably having a melt index of approximately between 0.1 and 20 dg/min.

The nature of the polynorbornene, of its plasticiser and of the other rubber in the elastoplastic composition according to the invention is the same as that shown above on the subject of the rubbery compositions.

The properties of the thermoplastic compositions according to the invention can be advantageously modified, for the requirements of certain special applications, by the addition of conventional ingredients such as:

white (titanium oxide) or coloured pigments, coupling agents such as silanes or titanates, antioxidants such as, for example, the zinc salt of mercaptobenzimidazole, stabilisers such as, for example, polymerised 2,2,4-trimethyl-1,2-dihydroquinoline, processing aids such as long-chain aliphatic amines, salts of stearic acid, and the like, pulverulent fillers such as carbon black, silica, kaolin, alumina, clay, aluminosilicate, talc, carbonate, and lubricants such as stearic acid.

In particular, the addition of pulverulent fillers has the effect of improving the tensile strength and, in some cases, the elongation at break of the thermoplastic composition according to the invention. The quantity of filler which can be incorporated in the composition may go up to 150 parts per 100 parts by weight of polynorbornene, this quantity being quite obviously variable depending on the nature of the filler.

Quite obviously, throughout the present invention the presence of a rubber other than polynorbornene is optional and the compositions may comprise only polynorbornene crosslinked by means of the compound of formula (I). The expression "a mixture of at least 50% by weight of polynorbornene and not more than 50% by weight of another rubber" must therefore be understood as equivalent to "from 50% to 100% by weight of polynorbornene and from 0 to 50% by weight of another rubber".

Furthermore, the quantity of plasticiser for polynorbornene which is needed to lower its glass transition temperature to the range of rubbers is well known to a person skilled in the art and generally lies between approximately 20 and 300 parts by weight per 100 parts of polynorbornene.

The thermoplastic compositions according to the invention are preferably prepared by dynamic vulcanisation, that is to say by kneading a mixture of polynorbornene, plasticiser, rubber, olefin-based crystalline polymer(s) and of the compound of formula (I), at a sufficient temperature and for a sufficient time to crosslink the mixture (B) of polynorbornene and rubber. The kneading may be carried out in a conventional apparatus such as, for example, a Banbury mixer, Brabender mixer, a Rheocord mixer or an extruder, at a temperature of approximately between 110° and 220° C. for a period of approximately between 3 and 15 minutes, this period being proportionally shorter the higher the temperature. Before this kneading stage the mixture may first of all be homogenised in an internal mixer at a moderate temperature approximately between 40° and 100° C.

The thermoplastic compositions according to the invention can be employed for manufacturing finished products and industrial articles by extrusion, extrusion blowing, injection moulding and compression moulding techniques.

In particular, they can be extruded on extruders of the same type as those commonly employed for polyolefins, that is to say those having a screw length/diameter ratio which is generally approximately between 18 and 28 and a compression ratio preferably close to 3.0. The temperature profile displayed along the screw is generally fairly flat, the temperature difference between the entry and the die being approximately from 10° C. to 20° C. The temperature of the composition in the extruder (temperature of the material) may be approximately between 150° C. and 220° C., preferably between 160° and 180° C. These extruders are fitted with profiled dies (for example industrial carpentry profiles). The speed of the extrusion lies approximately between 15 and 50 meters per minute and the extrudate is subjected to practically no drawing on leaving; it is cooled in a water bath and passes over a drawing bench whose speed is generally approximately between 100% and 110% of the extrusion speed.

The compositions according to the invention may also be injected by means of injection presses of the same type as those commonly employed for high and low density polyethylene and polypropylene. The temperature of the material in the press, which is a function of the proportion of plasticiser in the composition, is generally approximately between 120° C. and 200° C. This temperature is proportionally lower the higher the proportion of plasticiser. It is also generally advisable to employ an injection pressure which is markedly higher than the service pressure, so as to increase the fluidity of the material during the injection. By way of example, it will be possible to employ an injection pressure of 700 bars when the serivce pressure is 150 bars. The speed of the plasticising screw will be commonly capable of reaching approximately 100 to 200 revolutions per minute. Depending on the injection rate which is required, the mould temperature can be chosen approximately between $-10°$ C. and $+40°$ C.

Concrete applications of the compositions according to the invention include especially flexible tubing, seals for the building and motor vehicle industries, protective bellows for the motor vehicle industry, injected articles such as solid wheels for the toy industry, and the like.

The following examples are given by way of illustration of the present invention, no limitation being implied.

EXAMPLE 1

In a first stage 50 parts by weight of polynorbornene are formulated with 50 parts by weight of rubber, 50 parts by weight of filler, 50 parts by weight of plasticiser and 1 part by weight of antioxidant in an internal mixer of the Mielli type, controlled at 80° C., for 4 minutes. In a second stage the material is taken up again on the same mixer, controlled at 80° C., into which the vulcanising agent and the vulcanisation accelerator are added. The mixing is then continued for 8 minutes. In this example:

the polynorbornene employed is marketed by the Applicant Company under the name Norsorex ®, the plasticiser is a paraffinic oil with a flash point of 225° C. and a setting point of $-10°$ C., marketed by Exxon under the name Flexon ® 876, the rubber is a butadiene rubber marketed by Shell under the name BR 1220, the filler is carbon black marketed by Cabot under the name SRF, the antioxidant is a substituted phenol marketed by Ciba-Geigy under the name Irganox ® 1010, the vulcanising agent is hexachloro-para-xylene (4 parts by weight), the vulcanisation accelerator is a mixture by weight of 10 parts of zinc oxide per 2.5 parts of magnesia.

Thus formulated, the elastomer mix is vulcanised in a press at 180° C. for 15 minutes to form 2.5-mm plaques on which the following properties are measured:

elongation at break, expressed in % and determined according to ASTM standard D 412, tensile strength, expressed in MPa and determined according to ASTM standard D 412.

Both these properties are measured successively at the initial time (referred to as $EB_0$ and $TS_0$, after cooling the plaques), and after 15 days' aging at 100° C. (referred to as $EB_{15}^{100}$ and $TS_{15}^{100}$) and after 42 days' aging at 100° C. (referred to as $EB_{42}^{100}$ and $TS_{42}^{100}$).

The results of these measurements are shown in the table below.

EXAMPLES 2 TO 6

In a first stage, polynorbornene is formulated with a rubber, a plasticiser, a filler, at least one antioxidant and at least one vulcanising agent in an internal mixer rotating at 100 revolutions/min for 6 minutes, controlled at 80° C., and the formulation obtained is then converted into sheet by being run on a roll mill controlled at 60° C., on which a vulcanisation accelerator is added. In a second stage, the rubbery mass is treated by the addition of a mixture of crystalline polyolefins and is taken up again on a Brabender mixer rotating at 90 revolutions/min at a temperature of 180° C. for 8 minutes. The resulting composition is recovered and compression-moulded into 2.5-mm plaques on which the following properties are measured:

elongation at break, expressed in % and determined according to ASTM standard D 412, tensile strength, expressed in MPa and determined according to ASTM standard D 412.

Both these properties are measured successively at the initial time (referred to as $EB_0$ and $TS_0$, after cooling the plaques), and after 15 days' aging at 100° C. (referred to as $EB_{15}^{100}$ and $TS_{15}^{100}$), after 28 days' aging at 100° C. (referred to as $EB_{28}^{100}$ and $TS_{28}^{100}$) and after 42 days' aging at 100° C. (referred to as $EB_{42}^{100}$ and $TS_{42}^{100}$).

The results of these measurements are shown in the table below, together with the weight quantities of the various ingredients of the composition. In these examples:

the polynorbornene is marketed by the Applicant Company under the name Norsorex ®, the rubber is a styrene-butadiene rubber marketed by Shell under the name SBR 1502 (Examples, 2, 3, 5 and 6) or else a butadiene rubber marketed by Shell under the name BR 1220 (Example 4), the plasticiser is a naphthenic oil marketed by B.P. under the name EM 100 (Examples 2 to 4 and 6) or else a mixture of 55 parts by weight of the said oil and 170 parts by weight of a paraffinic oil with a flash point of 225° C. and a setting point of $-10°$ C., marketed by Exxon under the name Flexon ® 876 (Example 5), the filler is carbon black marketed by Cabot under the name MT, the antioxidant is a mixture by weight of 2 parts of a substituted phenol marketed by Ciba-Geigy under the name Irganox ® 1010 and 1 part of a sterically hindered diphenol marketed by Monsanto under the name Santavor ® A, the vulcanising agent is hexachloro-para-xylene (Examples 2, 4, 5 and 6) or else a mixture by weight of 4 parts of hexachloro-para-xylene and 3 parts of a phenolic resin of formula:

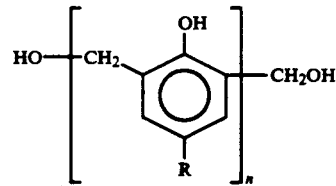

in which n=4 or 5 and R denotes an alkyl radical, marketed by Schenectady under the name SP 1045 (Example 3), the vulcanisation accelerator is a mixture by weight of 10 parts of zinc oxide per 2.5 parts of magnesia, and the mixture of crystalline polyolefins is a mixture comprising (by weight) 77% of a polypropylene marketed by Solvay under the name RF 110 and 23% of an ethylene/1-butene copolymer with a relative density of 0.910, which has a melt index of 1 dg/min, a crystalline melting peak of 116° C. and a crystallinity of 30%, marketed under the name Norsoflex ® FW 1600.

EXAMPLE 7 (COMPARATIVE)

The polynorbornene of the preceding examples is formulated with the plasticiser of Example 2 and with the other ingredients of Examples 2 to 6 in the proportions shown in the table below, with the exception of the vulcanising agent which in this case consists solely of the phenolic resin SP 1055 from Schenectady. The properties of the resulting thermoplastic composition after aging are shown in the table below.

TABLE

| Example | 1 | 2 | 3 | 4 | 5 | 6 | 7 |
|---|---|---|---|---|---|---|---|
| Polynorbornene | 50 | 80 | 80 | 80 | 80 | 80 | 100 |
| Plasticiser | 50 | 150 | 150 | 150 | 225 | 150 | 150 |
| Filler | 50 | 100 | 100 | 100 | 150 | 100 | 50 |
| Vulcanising agent | 4 | 4 | 7 | 4 | 4 | 4 | 10 |
| Vulcanisation accelerator | 12.5 | 12.5 | 12.5 | 12.5 | 12.5 | 12.5 | 0 |
| Rubber | 50 | 20 | 20 | 20 | 20 | 20 | 0 |
| Antioxidant(s) | 1 | 3 | 3 | 3 | 3 | 3 | 1 |
| Polyolefins | 0 | 104 | 105 | 104 | 140 | 0 | 104 |
| $EB_0$ | 170 | 370 | 360 | 350 | 360 | 490 | 170 |
| $TS_0$ | 6.2 | 7.7 | 6.1 | 5.7 | 4.9 | 11.5 | 4.0 |
| $EB_{15}^{100}$ | 160 | 310 | 230 | 240 | 240 | 350 | 8 |
| $TS_{15}^{100}$ | 6.6 | 7.9 | 5.6 | 6.0 | 5.4 | 8.5 | 1.0 |
| $EB_{28}^{100}$ | n.d. | 280 | 120 | 230 | 180 | n.d. | n.d. |
| $TS_{28}^{100}$ | n.d. | 7.2 | 4.2 | 5.9 | 4.7 | n.d. | n.d. |
| $EB_{42}^{100}$ | 150 | 280 | 100 | 200 | 180 | 280 | 4 |
| $TS_{42}^{100}$ | 6.6 | 7.2 | 4.0 | 5.2 | 4.8 | 8.0 | 0 | n.d. = not determined

EXAMPLE 8 (COMPARATIVE)

In a first stage, polynorbornene is formulated with a filler, a plasticiser and an antioxidant in an internal mixer of the Mielli type, controlled at 80° C., for 4 minutes. In a second stage the material is taken up again on the same mixer, controlled at 80° C., into which the vulcanizing agent and the vulcanisation accelerator are added. The mixing is then continued for 8 minutes. In this comparative example:

the polynorbornene employed is marketed by the Applicant Company under the name Norsorex ®, the plasticiser is a paraffinic oil with a flash point of 225° C. and a setting point of −10° C., marketed by Exxon under the name Flexon ® 876, the pulverulent filler is calcined kaolin, the antioxidant is a substituted phenol marketed by Ciba-Geigy under the name Irganox ® 1010, the vulcanising agent is a phenolic resin of formula:

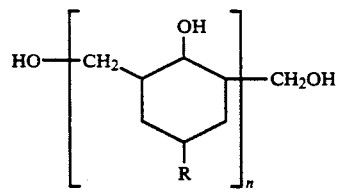

in which n=4 or 5 and R denotes an alkyl radical, marketed by Schenectady under the name SP 1045, the vulcanisation accelerator is a mixture by weight of 1 part of stannous chloride $SnCl_2.2H_2O$ per 10 parts of zinc oxide.

Thus formulated, the elastomer mix is vulcanised in a press at 180° C. for 15 minutes to form 2.5-mm plaques on which the following properties are measured:

elongation at break, expressed in % and determined according to ASTM standard D 412, tensile strength, expressed in MPa and determined according to ASTM standard D 412.

Both these properties are measured successively at the initial time (referred to as $EB_0$ and $TS_0$, immediately after cooling the plaques), and after 15 days' aging at 100° C. (referred to as $EB_{15}^{100}$ and $TS_{15}^{100}$).

The weight quantities of the various ingredients of the composition are shown in the table below, together with the results of measurements of properties, carried out as described above.

EXAMPLE 9

A rubbery composition whose properties are shown in Table II below is prepared under the same conditions as in Example 8 and using the same ingredients, with the following three exceptions:

the vulcanisation accelerator consists of zinc oxide,
the vulcanising agent is hexachloro-para-xylene,

TABLE II

| Example | 8 | 9 |
|---|---|---|
| Polynorbornene | 100 | 100 |
| Filler | 40 | 40 |
| Plasticiser | 150 | 150 |
| Antioxidant | 2 | 2 |
| Vulcanising agent | 10 | 4 |
| Vulcanisation accelerator | 11 | 10 |
| Magnesia | 0 | 2.4 |
| $EB_0$ | 450 | 520 |
| $TS_0$ | 7.7 | 8.9 |
| $EB_{15}^{100}$ | 61 | 400 |
| $TS_{15}^{100}$ | 0.6 | 8.3 |

We claim:

1. Polynorbornene-based rubbery composition with improved thermal behavior, comprising at least 50% by weight of polynorbornene and not more than 50% by weight of another rubber, said composition having been vulcanized by means of an effective quantity of at least one compound of formula:

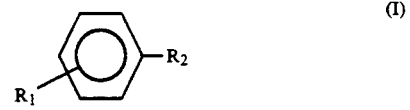

in which $R_1$ and $R_2$, which are identical or different, are chosen from radicals $CH_nX_{3-n}$, X being a halogen atom chosen from fluorine, chlorine and bromine, and n being an integer ranging from 1 or 2, said $R_1$ radical occupying a position ortho, meta or para to said $R_2$ radical.

2. Thermoplastic composition with improved thermal behavior, comprising:

from 10 to 90 parts by weight of at least one olefin-based crystalline polymer (A), from 90 to 10 parts by weight of a component (B) comprising at least 50% by weight of polynorbornene and not more than 50% by weight of another rubber, and a sufficient quantity of plasticizer for polynorbornene to lower its glass transition temperature to the range of rubbers, the sum of the polymer (A) and of the component (B) being equal to 100 parts by weight and the component (B) being vulcanized by means of an effective quantity of at least one compound of formula:

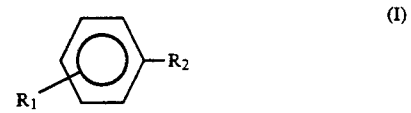

in which $R_1$ and $R_2$, which are identical or different, are chosen from radicals $CH_nX_{3-n}$, X being a halogen atom chosen from fluorine, chlorine and bromine, and n being an integer ranging form 0 to 2, said $R_1$ radical occupying a position ortho, meta or para to said $R_2$ radical.

3. Composition according to claim 1 characterized in that it additionally comprises at least one additive chosen from antioxidants, lubricants and pulverulent fillers.

4. Thermoplastic composition according to claim 2, characterized in that it additionally comprises at least one, additive chosen from pigments, coupling agents, stabilizers and processing aids.

5. Composition according to claim 2, characterized in that the olefin-based crystalline polymer is chosen from propylene polymers, radical ethylene polymers, linear ethylene polymers and copolymers of ethylene and alkyl acrylate.

6. Composition according to claim 1 characterized in that the rubber is chosen from natural rubber, nitrile rubber, butadiene rubber, styrene-butadiene rubber, polychloroprene, butyl and brominated butyl rubbers, polyisoprene and ethylene-propylene and ethylene-propylene-diene rubbers.

7. Composition according to claim 1, characterized in that, it additionally comprises at least one plasticizer capable of lowering the glass transition temperature of polynorbornene to the range of rubbers.

8. Composition according to claim 2 characterized in that the plasticizer is chosen from aromatic, naphthenic or paraffinic heavy oils with a setting point below 0° C. and a flash point above 180° C., and diesters of phthalic acid.

9. Composition according to claim 1 characterized in that the quantity of the compound of formula (I) is between 0.1% and 6% by weight, relative to the mixture of polynorbornene and rubber.

10. Industrial article obtained by extrusion, extrusion blowing, injection moulding or compression moulding of a composition according to claim 2.

* * * * *